United States Patent [19]

Sakurada

[11] Patent Number: 5,257,153
[45] Date of Patent: Oct. 26, 1993

[54] DISC CASE
[75] Inventor: Masataka Sakurada, Tokorozawa, Japan
[73] Assignee: Toppan Printing Co., Ltd., Japan
[21] Appl. No.: 24,784
[22] Filed: Mar. 1, 1993

Related U.S. Application Data

[63] Continuation of Ser. No. 869,263, Apr. 15, 1992, abandoned, which is a continuation of Ser. No. 540,160, Jun. 19, 1990, abandoned.

[30] Foreign Application Priority Data

Jun. 22, 1989 [JP] Japan .................................. 1-73259

[51] Int. Cl.⁵ .............................................. G11B 23/03
[52] U.S. Cl. ...................................... 360/133; 369/291
[58] Field of Search ............... 360/133; 369/291; 206/444

[56] References Cited

U.S. PATENT DOCUMENTS

| | | | |
|---|---|---|---|
| 4,550,354 | 10/1985 | Wakabayashi et al. | 360/133 |
| 4,589,105 | 5/1986 | Nemoto et al. | 369/291 |
| 4,785,369 | 11/1988 | Ommori et al. | 360/133 |
| 4,908,817 | 3/1990 | Sandell et al. | 369/291 |

FOREIGN PATENT DOCUMENTS 58-130475  8/1983  Japan .................................. 360/133

Primary Examiner—John H. Wolff
Attorney, Agent, or Firm—Lerner, David, Littenberg, Krumholz & Mentlik

[57] ABSTRACT

A disc case for releaseably receiving a disc therein includes a housing having a disc receiving portion formed therein, a shutter adapted to slidably move along one brim of the housing to properly expose a part of the disc to the outside and a spring member having at least two turn portions to generate a resilient force active in the direction of closing the shutter, one end of the spring member being engaged with a groove formed in one corner section of the housing, while other end of the spring member being engaged with one side end of the shutter opposite to the corner section. The one turn portion located in the vicinity of another side wall of the housing extending at a right angle relative to the one side wall of the housing has a part of the spring member extending from the one turn portion, wherein the extended part of the spring member is bent in the same direction of turn of the one turn portion. With such construction, no waste material is produced from the boundary wall of the housing, because frictional contact of the spring member with the boundary wall of the housing does not occur at the time when the shutter slidably moves in the opening/closing direction. Once the spring member is held in a fully opened state, it is properly received in a substantially triangular narrow space in the corner section of the housing.

5 Claims, 5 Drawing Sheets

DISC CASE

This is a continuation of application Ser. No. 07/869,263 filed Apr. 15, 1992, now abandoned, which is a continuation of Ser. No. 07/540,160 filed Jun. 19, 1990, abandoned.

BACKGROUND OF THE INVENTION

1. Field of the Invention

The present invention relates generally to a disc case in which a recording disc such as CDROM or the like is releaseably received. More particularly, the present invention relates to a disc case including a shutter opening/closing mechanism which is actuated with the aid of a spring member.

2. Description of the Prior Art

One of conventional disc cases is shown in FIG. 7. The disc case in which a disc is releaseably received includes a housing 1 and a cover (not shown). In addition, a shutter 2 is slidably disposed on the opposite side to a cover fitting surface of the housing 1 (hereinafter referred to as a rear surface) so as to properly expose a part of the disc to the outside for the purpose of recording or reproducing.

The housing 1 has a disc receiving portion 3 formed in a central region thereof, and the shutter 2 slidably disposed on the rear surface of the housing 1 is normally fully closed with the aid of a spring member 4. When a recording or reproducing operation is performed with the disc in a certain apparatus or equipment (not shown), the shutter 2 is translationally displaced against a resilient force of the spring member 4 in the leftward direction as seen in the drawing.

The aforementioned disc case is disclosed in an official gazette of Japanese Laid-Open Utility Model NO. 63-91870. According to this prior invention, the spring member 4 is designed in a widely opened V-shaped contour as seen in a plan view and a single turn portion is formed at the intermediate part of the spring member 4.

With the conventional disc case as constructed in the above-described manner, however, it has been found that the disc case has problems that the spring member 4 is easily broken because merely a single turn portion is formed on the spring member 4 and, if the number of turns of the turn portion increases, the turn portion becomes thick and thereby opposite ends of the turn portion come in contact with the inner wall surface of the housing 1. Another problem is that the spring 4 tends to collide against a boundary wall 5 defining a part of the disc receiving portion 3 because merely a single bent portion (i.e., turn portion) is formed on the spring member 4, resulting in return movement of the spring member 4 failing to be carried out correctly and smoothly.

To obviate the foregoing problems, the inventor has made a proposal as disclosed in an official gazette of Japanese Laid-Open Utility Model NO. 63-130975. According to this prior invention, a disc case in which a disc is releaseably received includes a housing 6 having a disc receiving portion formed in a central region thereof, a shutter 7 adapted to slidably move along one brim of the housing 6 to properly expose a part of the disc to the outside and a spring member 9 for generating a resilient force active in the direction of closing the shutter 7, one end of the spring member 9 being engaged with a groove 8 formed in one corner section of the housing 8, while other end of the spring member 9 being engaged with one side end of the shutter 7 opposite to the corner section of the housing 8, wherein the spring member 9 includes at least two turn portions 10, as shown in FIG. 8.

With the spring member 9 including two turn portions as shown in FIG. 8, no problem occurs, when the housing 6 has a wide spring receiving portion in which the spring member 9 is received. However, when the spring receiving portion is dimentioned small such that the spring member 9 is received in a narrow space, there arise problems that as the shutter 7 is repeatedly opened and closed many times, a property of slidable movement of the shutter 7 is increasingly degraded due to frequent frictional contact of the spring member 9 with a boundary wall defining a part of the disc receiving portion and moreover a number of fine waste particles in the form of resin grains is produced from the boundary wall defining a part of the disc receiving portion because of the aforementioned frequent frictional contact. Particularly, in a case where the spring receiving portion is jointed to the disc receiving portion, the disc is unavoidably contaminated with such fine waste particles. For the reason, any oil is not allowed to be used for the spring member 9. Thus, it has been heretofore required to satisfactorily solve the problem on undesirable frequent frictional contact. In view of the foregoing problems, a proposal has been made such that an angle $\zeta$ of the spring member 9 in FIG. 8 is increased. This proposal is effective for preventing the aforementioned frictional contact from occurring frequently and minimizing a quantity of fine waste material derived from the repeated frictional contact. However, the problem on durability of the spring member 9 is left still unsolved, because a force exerted on the spring member 9 when the shutter 7 is fully closed becomes excessively large.

SUMMARY OF THE INVENTION

The present invention has been made with the foregoing background in mind.

An object of the present invention is to provide a disc case in which a disc is releaseably received wherein a space to be assumed by a spring receiving portion need not be enlarged.

Other object of the present invention is to provide a disc case in which a disc is releaseably received wherein a spring member is not brought in contact with a boundary wall which defines a part of a disc receiving portion and thereby no waste material is derived from the boundary wall.

Another object of the present invention is to provide a disc case in which a disc is releaseably received wherein a shutter can be opened and closed correctly and smoothly.

To accomplish the above objects, the present invention provides a disc case for releaseably receiving a disc wherein the disc case includes a housing having a disc receiving portion formed therein, a shutter adapted to slidably move along one brim of the housing to properly expose a part of the disc to the outside and a spring member having at least two turn portions to generate a resilient force active in the direction of closing the shutter, one end of the spring member being engaged with a groove formed at one corner section of the housing, while other end of the spring member being engaged with one side end of the shutter opposite to the corner section of the housing, wherein one of the turn portions located in the vicinity of another side wall extending at a right angle relative to the one side wall of the housing has a part of the spring portion extending from the one turn portion, the part being bent in the same direction as that of turn of the one turn portion.

According to the present invention, the spring member in the disc case includes at least two turn portions to generate a resilient force active in the direction of closing the shutter and a part of the spring member extending from the one turn portion located in the vicinity of the side wall of the housing is bent in the same direction as that of turn of the one turn portion. Thus, when the shutter is actuated in the opening/closing direction, an outer force exerted on the spring member is correctly distributed, whereby the spring member is reliably bent at a plurality of locations. Therefore, when the spring member is received in a bent state in a substantially triangular space in an one corner section of the housing, there does not occur any malfunction.

In addition, it is assured that the shutter is smoothly opened or closed without contact of the spring member with the boundary wall defining a part of the disc receiving portion by adequately changing a spring constant of each turn portion (or the number of turns of the turn portion or a diameter of the turn portion) or a spring angle of the spring member at the turn portion. Consequently, waste material is not produced from the boundary wall because no frictional contact takes place. Additionally, durability of the spring member is increased desirably.

Further, according to the present invention, a relationship represented by an equation of $\alpha \approx \beta - \gamma$ is established, when it is assumed that an opening angle of the one turn portion located in the vicinity of the side wall of the housing is identified by $\alpha$, an opening angle of the other turn portion situated on the shutter side is identified by $\beta$ and a bending angle of the bent part at the one turn portion in the vicinity of the side wall of the housing is identified by $\gamma$. Thus, there is no possibility that durability of the spring member is deteriorated, because the spring member does not come in contact with the boundary wall defining a part of the disc receiving portion. Therefore, the disc case is used with excellent operational properties, when the shutter is actuated in the opening/closing direction.

Other objects, features and advantages will become apparent from reading of the following description which has been made with reference to the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate a preferred embodiment thereof.

Figure 1:
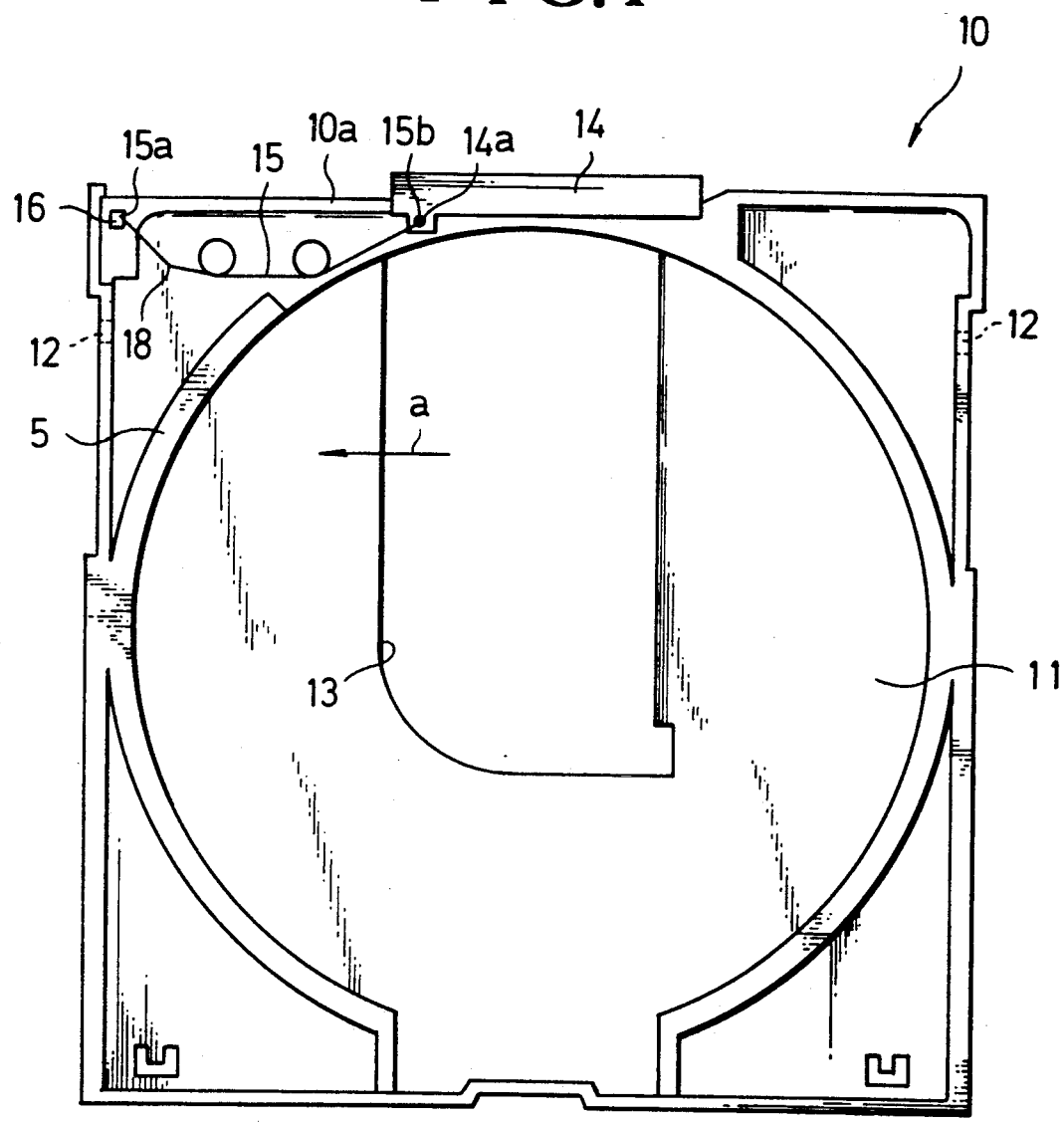
FIG. 1 is a plan view illustrating a housing for a disc case in accordance with an embodiment of the present invention.

In FIG. 1, reference numeral 10 designates a housing for the case disc of the present invention. The housing 10 has a disc receiving portion 11 formed in the central region thereof, and a pair of engagement holes 12 are formed on the left-hand and right-hand side walls of the housing 10. A cover (not shown) is releaseably attached to the front open side of the housing 10 to openably or closeably turn about the engagement holes 12. Incidentally, the cover should not be limited only to the foregoing arrangement. Alternatively, it may immovably be secured to the housing 10.

As shown in FIG. 1, a part of the bottom wall of the disc receiving portion 11 is cut off to form a window 13. The window 13 is normally closed with a shutter 14. When the disc case is practically used for the purpose of recording or reproducing in a certain apparatus or equipment (not shown), the shutter 14 is translationally displaced in the a arrow-marked direction in FIG. 1 so as to close the window 13 therewith.

Figure 2:
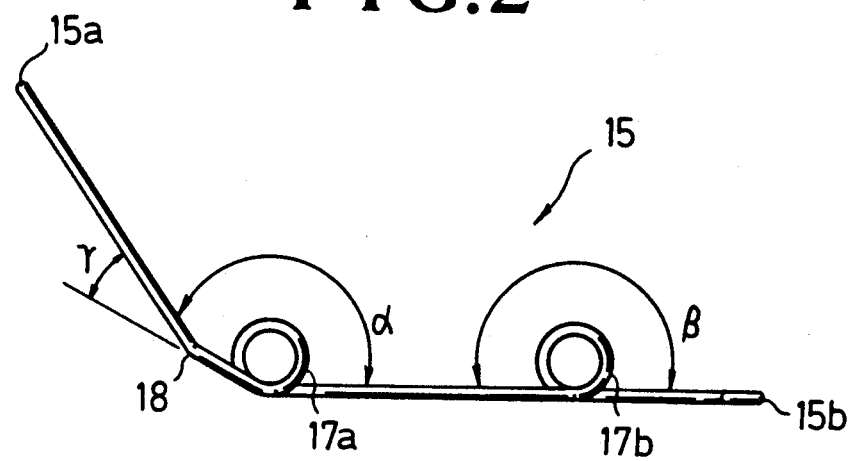
FIG. 2 is an enlarged plan view, particularly illustrating a spring member which is used for an opening/closing mechanism for actuating a shutter for the disc case in FIG. 1.
Figure 3:
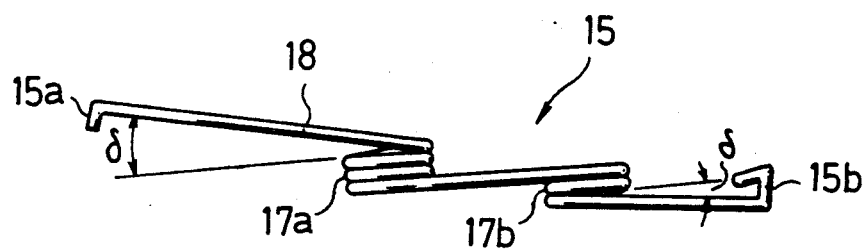
FIG. 3 is a side view of the spring member in FIG. 2.

The shutter 14 has an engagement groove formed on one end side thereof. One brim 10a of the housing 10 is brought in slidable engagement with the engagement groove, whereby the shutter 14 translationally moves along the brim 10a. Such translational slidable movement of the shutter 14 as described above is accomplished under the influence of a resilient force imparted by a spring member 15 having a widely opened V-shaped contour as seen in a plan view. In detail, the spring member 15 is accommodated in one substantially triangular corner section of the housing 10. One end 15a of the spring member 15 is engaged with a groove 16 at one corner of the housing 10, while other end 15b of the spring member 15 is engaged with one end 14a of the shutter 14 at the engagement groove thereof. As shown in FIG. 2 and FIG. 3, the spring member 15 includes two turn portions 17a and 17b. A part of the spring member 15 extending from one end of the turn portion 17a is bent in the same direction as that of turn of the turn portion 17a. A relationship between a spring constant A of the turn portion 17a and a spring constant B of the turn portion 17b is represented by an inequality of $A < B$, and this relationship can adequately be adjusted by changing the present ratio of the number of turns of the turn portion 17a to the number of turns of the turn portion 17b (e.g., 3:2) or a ratio of a diameter of the turn portion 17a to a diameter of the turn portion 17b (e.g., 5;6) to another ratio. Such adequate adjustment of the aforementioned relationship assures that the part of the spring member 15 extending from the turn portion 17a is bent ahead of a part of the spring member 15 extending from the turn portion 17b. In addition to the number of turns and the diameter of each spring portion, an angle $\alpha$ of the turn portion 17a, an angle $\beta$ of the turn portion 17b and an angle $\gamma$ defined by an outer end part of the turn portion 17a and the bent part of the spring member 15 may be adjusted such that a relationship as represented by an equation of $\alpha \approx \beta - \gamma$ is established among the angles $\alpha$, $\beta$ and $\gamma$. If an inequality of $\alpha < < \beta - \gamma$ is established among them, the result is that durability of the spring member 15 is deteriorated. To the contrary, an inequality of $\alpha > > \beta - \gamma$ is established among them, there is a possibility that the spring member 15 comes in contact with the boundary wall which defines a part of the disc receiving portion 11.

The one end 15a of the spring member 15 engaged with the groove 16 is bent at a substantially right angle, while the other end 15b of the spring member 15 engaged with the one end of the shutter 14 at the engagement groove thereof is bent to a hook-shaped contour.

Referring to FIG. 3, one end part of the spring member 15 extending from the turn portion 17a is inclined by an angle of $\delta$ relative to a plane extending contiguous to the turn portion 17a, while other end part of the spring 15 extending from the turn portion 17b is likewise inclined by an angle of $\delta$ relative to a plane extending contiguous to the turn portion 17b. It is preferable that the angle $\delta$ is set within the range of 3° to 13°. If the angle $\delta$ is set to a certain minus value, the turn portion 17a and the turn portion 17b are largely twisted when the shutter 14 is fully closed, whereby a return force derived from the spring member 15 fails to act in the direction of closing the shutter 14. In addition, when the angle $\delta$ is set to the minus value in that way, wringing is liable to occur with each of the turn portions 17a and 17b, resulting in durability of the spring member 15 being deteriorated remarkably. For the reason, it is desirable that the angle $\delta$ is set within the range of a certain plus value as mentioned above. Additionally, it is advantageously desirable that the angle $\delta$ is set to a angle smaller than 5°. Once the angle $\delta$ (representative of an opening angle of the spring member 15) is set to a certain adequate plus value in that way, the shutter 14 can smoothly be closed without an occurrence of excessive twisting of the spring member 15. If the angle $\delta$ is set to an excessively large plus value, the spring member 15 is liable to leap up when it is mounted in the aforementioned triangular corner section of the housing 10.

Figure 4:
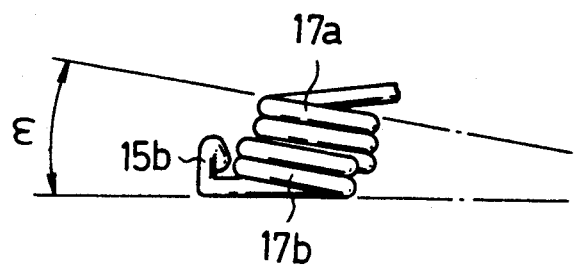
FIG. 4 is a side view of the spring member as seen from one side end thereof.

In addition, as shown in FIG. 4, it is desirable that another opening angle $\epsilon$ defined by a plane extending contiguous to the turn portion 17a and a plane extending contiguous to the turn portion 17b when their axis lines are inclined by a certain angle relative to each other is set within the range of $5° \pm 5°$. If the angle $\epsilon$ is set to a certain minus value, a resilient resistant force derived from the spring member 15 is distributed ineffectively. To the contrary, if the angle $\epsilon$ is set to a plus value larger than 10°, the spring member 15 is excessively twisted with the result that a resilient resistant force of the spring member 15 is likewise distributed ineffectively.

Figure 5:
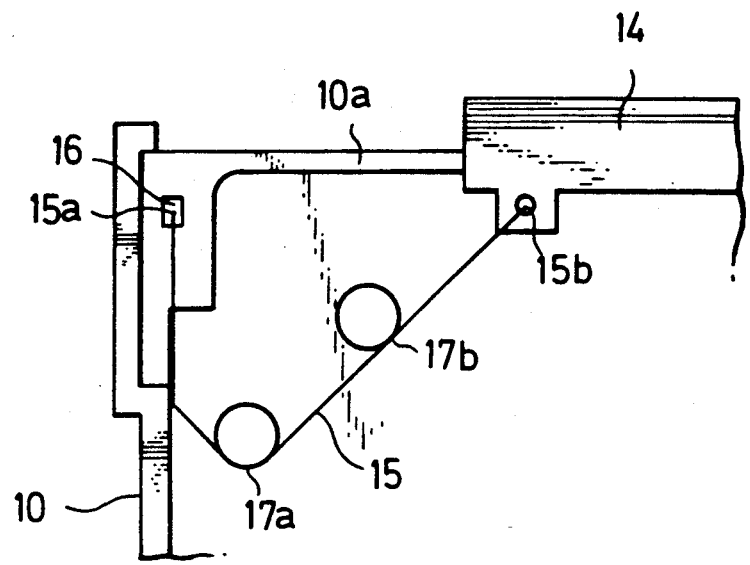
FIG. 5 is a fragmentary plan view of the disc case, particularly illustrating the spring member in an intermediately opened state.
Figure 6:
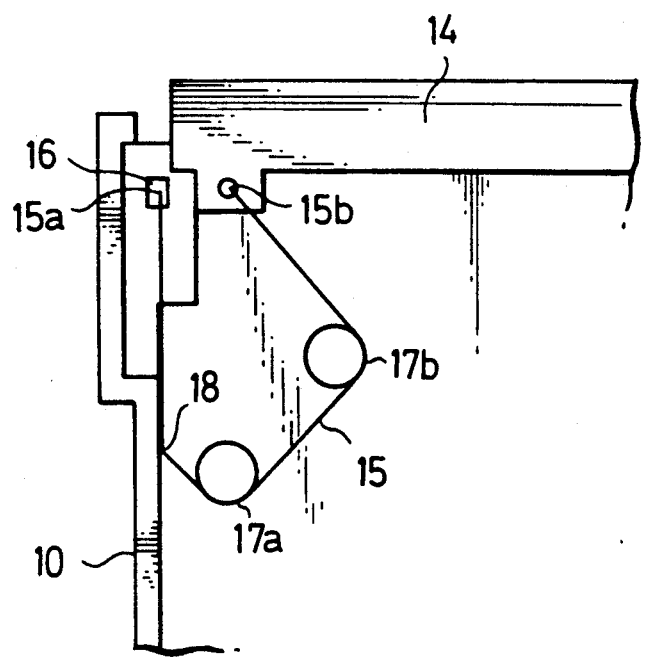
FIG. 6 is a fragmentary plan view of the disc case, particularly illustrating the spring member in a fully opened state.
Figure 7:
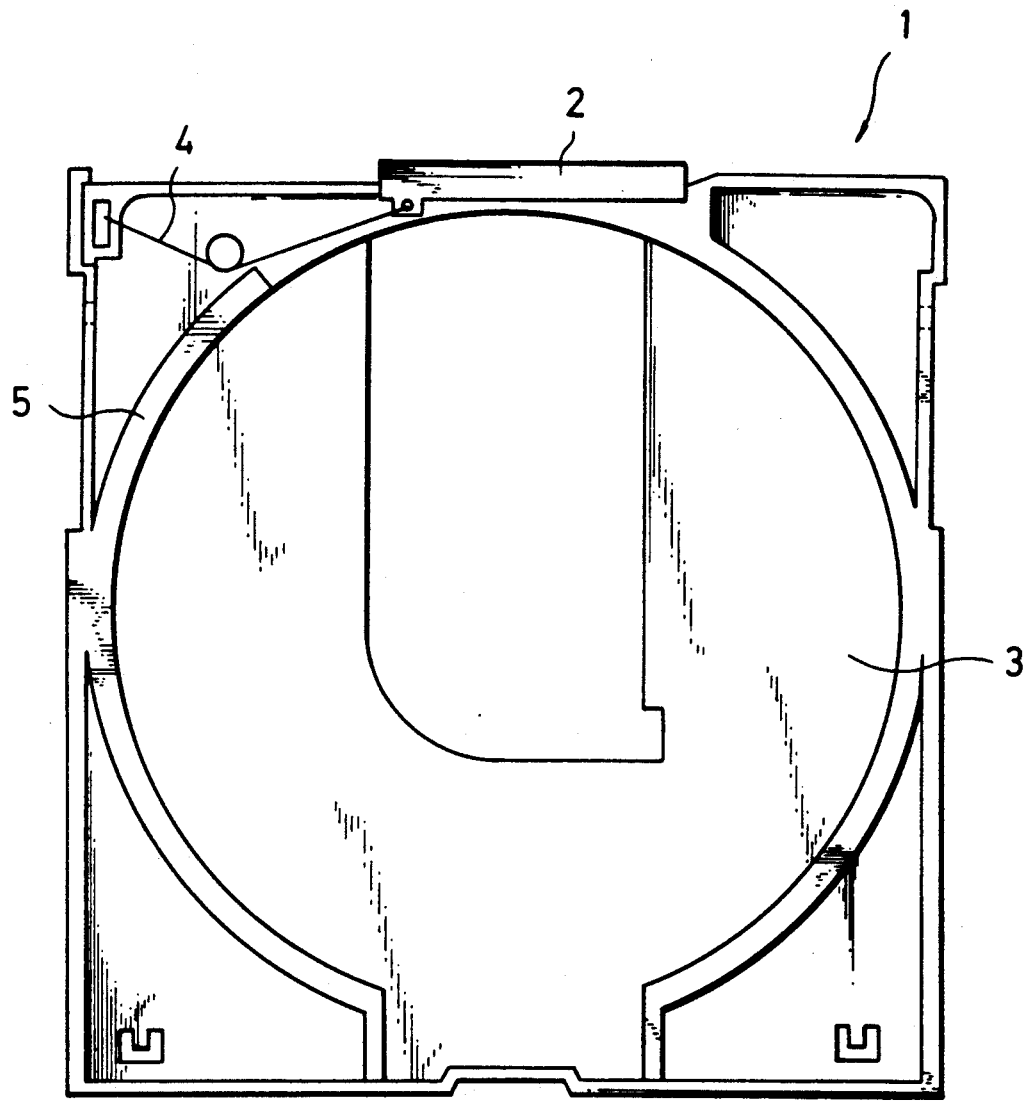
FIG. 7 is a plan view similar to FIG. 1, illustrating a housing for a conventional disc case.
Figure 8:
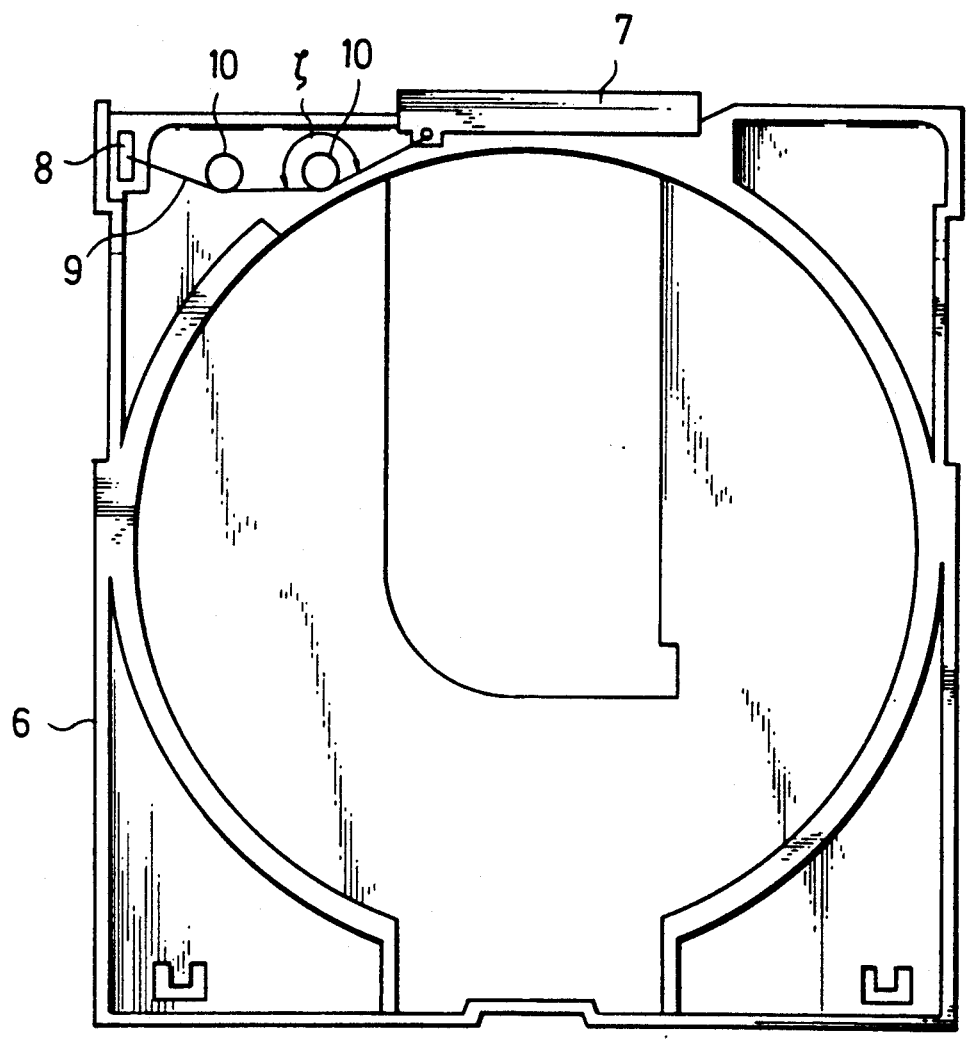
FIG. 8 is a plan view similar to FIG. 1, illustrating a housing for another conventional disc case.

In a case where the spring member 15 includes a bent portion 18 which is bent in a widely opened V-shaped contour as seen in a plan view in the same direction as that of turn of one of the turn portions located in the vicinity of the side wall of the housing 10, i.e., the turn portion 17a, the bent portion 18 functions as shown in FIG. 5, when it is held in an intermediately opened state. Additionally, the bent portion 18 functions as shown in FIG. 6, when it is held in a fully opened state. Specifically, when the shutter 14 is held at a fully closed state, the spring member 15 exhibit a widely opened V-shaped contour as seen in a plan view (refer to FIG. 1). As the shutter 14 is displaced in the opening direction, the turn portion 17a and the turn portion 17b are displaced in the same direction while gradually bending the spring member 15 with the turn portion 17a and the turn portion 17b serving as a fulcrum, respectively. It should be noted that bending occurs with the turn portion 17a ahead of the turn portion 17b. During this displacement, the bent portion 18 is brought in contact with the side wall of the housing 10 (see FIG. 5). As the shutter 14 is displaced further, bending occurs with the turn portion 17b. Subsequently, bending occurs with the both turn portions 17a and 17b, whereby the shutter 14 is held in a fully opened state (see FIG. 6). Finally, the spring member 15 is received in a fully bent state in the substantially triangular corner section of the housing 10.

On the other hand, when the shutter 14 is closed, the spring member 15 smoothly functions in the reverse manner to the time when it is opened, until it is restored to the original position.

Since the spring member 15 includes a bent portion at a position outside of the turn portion 17a where a part of the spring member 15 is bent by an angle of $\gamma$ ($\gamma = 5°$ to 40°), a sufficiently high intensity of repulsive force required for closing the shutter 14 is obtainable. With the spring member 15 of the present invention as constructed in the above-described manner, durability of the spring member 15 is not deteriorated irrespective of how much the angle $\beta$ is increased.

While the present invention has been described above with respect to the case where the spring member 15 includes two turn portions, it should of course be understood that the present invention should not be limited only to this case. Alternatively, the spring member 15 may include three or more turn portions. Additionally, other various changes or modification may be made without departure of the scope of the invention as defined by the appended claims.

What is claimed is:

1. A disc case for releasably receiving a disc comprising: a housing having a disc receiving portion formed therein, said housing also having a front wall including a window and a first side wall perpendicular to said front wall, said first side wall and said front wall forming a first corner, said first corner including a groove; a shutter adapted to slidably move along said front wall of said housing to open and close said window to expose a part of said disc; and a spring member having a first turn portion and a second turn portion, said first and second turn portions each comprising a plurality of annular loops defining a coil and being bendable within said disc case and said spring member being adapted to generate a resilient force active in a direction of closing said shutter, said spring member having a first end and a second end said first end of said spring member being engaged with said groove formed at said first corner and said second end of said spring member being engaged with said shutter; said first turn portion located adjacent said first side wall of said housing; said spring member also including a first extended portion disposed between said first turn portion and said first end, said first extended portion comprising a first linear portion proximate to said first turn portion and a second linear portion proximate to said first end disposed at an angle with respect to said first linear portion so as to create a bend in said first extended portion.

2. The disc case of claim 1, wherein said first turn portion has a first spring constant and said second turn portion has a second spring constant, said first spring constant being smaller than said second spring constant, whereby said shutter may be smoothly opened and closed.

3. The disc case of claim 1, wherein said spring member includes a second extended portion comprising a third linear portion disposed between said first and third linear portions, and a third extended portion comprising a fourth linear portion disposed between said second turn portion and said second end, an angle alpha between said first and third linear portions, an angle beta between said third and fourth linear portions, and an angle gamma between said first and second linear portions of said first extended portion, the angle alpha being approximately equal to the angle beta minus the angle gamma.

4. The disc case of claim 1, wherein said part of said spring member disposed between said first turn portion and said first end of said spring member is bent in a direction toward said first turn portion.

5. The disc case of claim 1, wherein said first end and said second end of said spring member are bent away from a plane defined by said first and said second turn portions and a portion of said spring member therebetween so as to each define an angle delta which may be the same or different at said first and said second end.

* * * * *

UNITED STATES PATENT AND TRADEMARK OFFICE
CERTIFICATE OF CORRECTION

PATENT NO. : 5,257,153
DATED : October 26, 1993
INVENTOR(S) : Sakurada

It is certified that error appears in the above-indentified patent and that said Letters Patent is hereby corrected as shown below:

Column 5, line 6, after the "," insert the word --if--.

Column 6, line 51, "bendable" should read --translatable--.

Signed and Sealed this

Seventh Day of March, 1995

Attest:

BRUCE LEHMAN

*Attesting Officer*   *Commissioner of Patents and Trademarks*